United States Patent
Raju et al.

(10) Patent No.: US 11,023,324 B2
(45) Date of Patent: Jun. 1, 2021

(54) HARMONIZATION OF FAILURE DOMAINS IN A DISTRIBUTED SYSTEM

(71) Applicant: EMC IP Holding Company LLC, Hopkinton, MA (US)

(72) Inventors: Suraj Raju, Issaquah, WA (US); Travis Lane, Seattle, WA (US); Douglas Kilpatrick, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 203 days.

(21) Appl. No.: 16/263,587

(22) Filed: Jan. 31, 2019

(65) Prior Publication Data

US 2020/0250039 A1 Aug. 6, 2020

(51) Int. Cl.
*G06F 11/00* (2006.01)
*G06F 11/14* (2006.01)
*H04L 29/08* (2006.01)
*G06F 16/176* (2019.01)
*G06F 16/182* (2019.01)
*G06F 16/901* (2019.01)
(Continued)

(52) U.S. Cl.
CPC ...... *G06F 11/1425* (2013.01); *G06F 11/3433* (2013.01); *G06F 16/134* (2019.01); *G06F 16/1774* (2019.01); *G06F 16/182* (2019.01); *G06F 16/9014* (2019.01); *H04L 67/1044* (2013.01); *H04L 67/1059* (2013.01); *G06F 2201/81* (2013.01)

(58) Field of Classification Search
CPC ............. G06F 11/1425; G06F 11/3433; G06F 16/182; G06F 16/9014; G06F 16/1774; G06F 16/134; H04L 67/1044; H04L 67/1059
See application file for complete search history.

(56) References Cited

U.S. PATENT DOCUMENTS 9,330,107 B1 * 5/2016 Kesselman ........... G06F 16/182
9,747,323 B1 * 8/2017 Kilpatrick ........... G06F 16/1774
10,198,205 B1 * 2/2019 Freilich .................. G06F 3/061
(Continued)

OTHER PUBLICATIONS

Crush Map, http://docs.ceph.com/docs/jewel/rados/operations/crush-map/, Last accessed Jan. 31, 2019, 28 Pages.

*Primary Examiner* — Philip Guyton
(74) *Attorney, Agent, or Firm* — Amin, Turocy & Watson, LLP

(57) ABSTRACT

Harmonization of failure domains in a distributed system is provided herein. A data storage system as described herein can include a memory that stores computer executable components and a processor that executes computer executable components stored in the memory. The computer executable components can include a node assignment component that assigns computing nodes in the data storage system to respective failure domains of a set of data failure domains, a hashing component that generates hashing information associated with respective computing nodes of the computing nodes assigned to a selected failure domain of the set of failure domains, and a group update component that designates at least one computing node of the computing nodes in the selected data failure domain to perform an operation associated with the hashing information.

20 Claims, 9 Drawing Sheets

(51) Int. Cl.
　　　*G06F 11/34*　　　(2006.01)
　　　*G06F 16/13*　　　(2019.01)

(56) References Cited

U.S. PATENT DOCUMENTS

| | | | | |
|---|---|---|---|---|
| 2013/0290295 | A1* | 10/2013 | Soules | G06F 16/27 707/714 |
| 2016/0077933 | A1* | 3/2016 | Ventura | G06F 11/2023 714/4.1 |
| 2017/0149890 | A1* | 5/2017 | Shamis | G06F 15/17331 |
| 2018/0300252 | A1* | 10/2018 | Han | G06F 11/2094 |
| 2019/0042126 | A1* | 2/2019 | Sen | G06F 9/28 |

* cited by examiner

US 11,023,324 B2

HARMONIZATION OF FAILURE DOMAINS IN A DISTRIBUTED SYSTEM

TECHNICAL FIELD

The subject application is related to distributed computing systems, and more particularly, to techniques for improving performance of a distributed computing system.

BACKGROUND

Distributed computing systems can operate by splitting a work space among multiple participating devices (nodes), which can result in improved computing efficiency as compared to that associated with a single-device system. Defining characteristics of a distributed computing system can include independent failure of components and/or processes, e.g., the failure of one process or component will not necessarily result in the failure of other components and/or processes that are working closely with the failed process or component, as well as the lack of shared memory, disks, and/or internal clock between respective devices of the system.

A distributed computing system can have multiple types of work that is desirably scaled out, and by extension multiple ways to scale out that work. However, when a conceptually single unit of work turns into multiple different types of work as a result of scaling, a risk can arise that the scale out methods will be different across devices of the system, resulting in respective nodes of the system partaking in the work in unexpected ways. This can, in turn, lead to unexpected failure conditions, particularly in the case where the availability of respective computing devices in a distributed system is altered, e.g., due to devices being added to or removed from the system.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

Various aspects described herein relate to improved generation and usage of failure domains in a distributed computing system. As described herein, a failure domain can include a set of computing nodes in a given cluster that are designated to hold a set of data (e.g., data associated with keys of a distributed hash table and/or other information) associated with the system. The failure domains can be structured such that the set of data can be retrievable as long as at least one node in the failure domain is operational. As further described herein, nodes can be designated in this manner in a two-step process by first selecting a failure domain and then selecting nodes within that failure domain. Various aspects described herein further relate to techniques by which hashing information associated with the above process can be kept consistent with the failure domains associated with the system.

In an aspect, a data storage system is described herein. The data storage system includes a memory that stores computer executable components and a processor that executes computer executable components stored in the memory. The computer executable components can include a node assignment component that assigns computing nodes in the data storage system to respective failure domains of a set of failure domains, a hashing component that generates hashing information for respective computing nodes of the computing nodes assigned to a selected failure domain of the set of failure domains, and a group update component that designates at least one computing node of the computing nodes in the selected failure domain to perform an operation associated with the hashing information.

In another aspect, a method is described herein. The method can include assigning, by a device operatively coupled to a processor, computing nodes in a data storage system to respective failure domains of a group of failure domains, generating, by the device, distributed hashing information for respective computing nodes of the computing nodes assigned to a selected failure domain of the group of failure domains, and designating, by the device, at least one computing node in the selected failure domain to perform an operation associated with the distributed hashing information.

In an additional aspect, a machine-readable medium including computer executable instructions is described herein. The instructions, when executed by a processor of a data storage system, can facilitate performance of operations including assigning computing nodes in the data storage system to respective failure domains, generating a distributed hash table associated with respective computing nodes of the computing nodes assigned to a selected failure domain of the respective failure domains, and designating at least one computing node in the selected failure domain to perform an operation associated with the distributed hash table.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
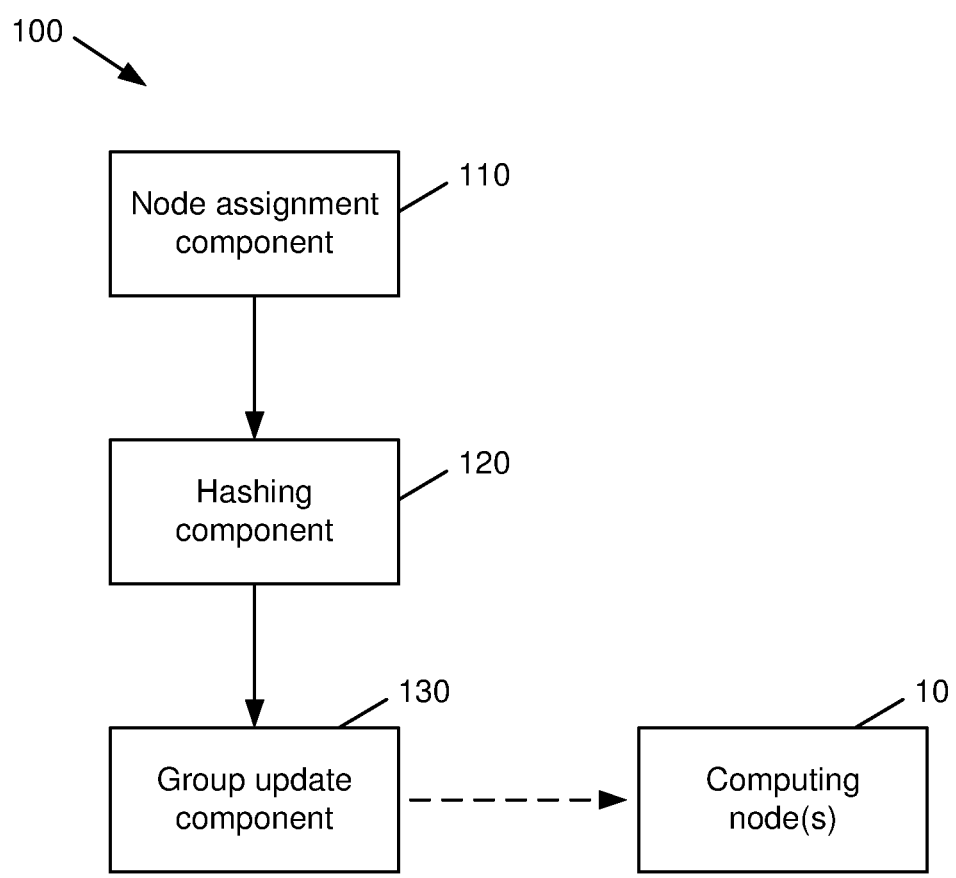
FIG. 1 is a block diagram of a system that facilitates harmonization of failure domains in a distributed computing system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Distributed computing systems can achieve improvements in computing performance over non-distributed systems through scalability, e.g., by splitting a work space among multiple participating computing devices. To improve the reliability of a distributed computing system, techniques can be employed to mitigate the impact of individual device failure and/or other events that can negatively impact the performance of one or more machines in the system.

In one example, a scale-out file system can be implemented as a distributed computing system that includes multiple computing devices (nodes). Such a file system can in some cases lay out data across multiple drives by, e.g., selecting drives having sufficient available space. The file system can further constrain drive and node choices such that copies and/or protection blocks for data are limited to a single failure domain to increase mean-time-to-data-loss. Further, the file system can be designed with a level of redundancy that ensures data are protected from unavailability due to node failure. By way of specific, non-limiting example, a system can be constructed such that two node failures in a given failure domain do not prevent access to data but three node failures do. In such an example, the system could tolerate unavailability of up to two nodes with no or minimal impact, but further unavailable nodes in a single failure domain could adversely impact the integrity of stored data and/or access to such data.

As the number of computing nodes and/or associated drives in distributed file systems increases, e.g., due to increasing file sizes, demand for data access, and/or other factors, maintaining sufficient node uptime can adversely impact the performance of the system in some cases. For instance, in the event that computing nodes are to be taken offline and/or otherwise made unavailable to perform hardware or software upgrades, the number of nodes that can be removed from the system at the same time can be limited by factors such as data reliability policies, disk redundancy, or the like. In some cases, these policies can result in upgrades to large numbers of computing nodes in series, thereby greatly increasing the time associated with performing a full system upgrade. In a sufficiently large network, system upgrades involving large numbers of computing nodes in series can take on the order of days or even weeks to complete.

Various aspects described herein can mitigate the impact of system upgrades and/or other causes of node unavailability by enabling the system to schedule group updates on the basis of the data failure domains existing within the system. This can, in turn, enable a larger number of computing nodes to be removed from the system in parallel, greatly reducing the amount of time associated with system upgrades and/or other group updates.

By implementing various embodiments as described herein, various improvements to the operation of a computing system and/or other advantages can be achieved. These can include, but are not limited to the following. System-wide updates in a distributed computing system can be made more efficient in terms of time, maintenance costs, power usage, and/or other factors. Reliability and integrity of data stored on a distributed file system can be increased. Adaptability of a distributed computing system to individual node failures can be improved. Other advantages are also possible.

With reference now to the drawings, FIG. 1 illustrates a system 100 that facilitates harmonization of failure domains in a distributed computing system in accordance with various aspects described herein. As shown in FIG. 1, system 100 includes a node assignment component 110 that can assign computing nodes 10 in a data storage system to respective failure domains, e.g., from among a set of failure domains.

As used herein, a failure domain can refer to a data failure domain, e.g., a set of computing nodes and/or a set of disks associated with one or more computing nodes that store a defined exclusive set of data. For instance, nodes and/or disks in a data failure domain can store files (e.g., video, audio, documents, etc.) associated with one or more client users, client lock data associated with a particular segment of the client base of the data storage system (e.g., as will be discussed in further detail with respect to FIG. 2), or the like. In an aspect, a given set of data associated with a data failure domain can be made mutually exclusive to other sets of data associated with other data failure domains, thereby limiting the impact that failure of one data failure domain can have on unrelated data stored by other data failure domains. Data associated with a failure domain can be further protected by reducing commonalities between disks and/or nodes associated with the failure domain according to various criteria. For instance, computing nodes and/or disks installed in the same physical chassis can be placed into different failure domains in order to reduce the possibility of multiple device failures in the same failure domain due to hardware problems associated with the chassis and/or other similar issues. Other similar precautions could also be taken.

As further used herein, the term "disk pool" is used to refer to a data failure domain that includes disks or other storage devices associated with one or more computing nodes 10, and the term "node pool" is used to refer to a set of computing nodes 10 with completely overlapping disk pools. It should be appreciated, however, that a data failure domain can be and/or otherwise include a disk pool, a node pool, and/or any other suitable structure(s).

While various aspects described herein are directed to data failure domains, it should be appreciated that other types of failure domains could be used. For instance, in addition to data, failure domains can be delineated in a distributed system on the basis of electric power distribution, network switches, and/or other parameters.

In an aspect, the node assignment component 110 can assign respective computing nodes 10 and/or their associated storage devices to a failure domain in any suitable manner. For instance, the node assignment component 110 can assign computing nodes 10 to a failure domain randomly and/or based on factors such as physical location, logical grouping, or the like. By way of example, devices can be assigned to failure domains based on commonalities between respective devices of different failure domains as described above. Additionally, it should be appreciated that a data storage system can be associated with any suitable number of failure domains, including one failure domain or more failure domains, as appropriate based on the properties of the system.

As further shown in FIG. 1, system 100 includes a hashing component 120 that can generate hashing information associated with computing nodes 10 that are assigned to a selected failure domain from the set of failure domains as described above. In an aspect, the hashing information can include distributed hashing information, such as that associated with a distributed hash table and/or other suitable data structures.

System 100 additionally includes a group update component 130 that can designate at least one computing node 10 from the selected failure domain hashed by the hashing component 120 to perform an action associated with the hashing information generated by the hashing component 120. For instance, the group update component 130 can designate a computing node 10 to store keys and/or other information associated with a distributed hash table and/or other suitable data structure. Also or alternatively, the group update component 130 can designate a computing node 10 for temporary or permanent removal from the system, thereby reallocating any hashing information associated with the removed node 10 to one or more other nodes 10 in the same failure domain, e.g., as will be discussed below with respect to FIGS. 3-4.

As stated above, the group update component 130 can determine respective computing nodes 10 to temporarily remove from the data storage system in the event of, e.g., system-wide hardware and/or software upgrades, and/or for other purposes. For instance, the group update component 130 can formulate a queue and/or other structure to regulate which computing nodes 10 are taken offline at a given time. In this way, the group update component 130 can regulate the number of computing nodes 10 that are scheduled to be unavailable at a given time and restrict or eliminate the possibility of computing nodes 10 associated with the same failure domain being removed from the system at the same time, thereby ensuring that data reliability assurances can be met during a large-scale system update and/or in other similar circumstances. Techniques by which the group update component 130 can facilitate removal of computing nodes 10 from an associated failure domain are described in further detail below.

Figure 2:
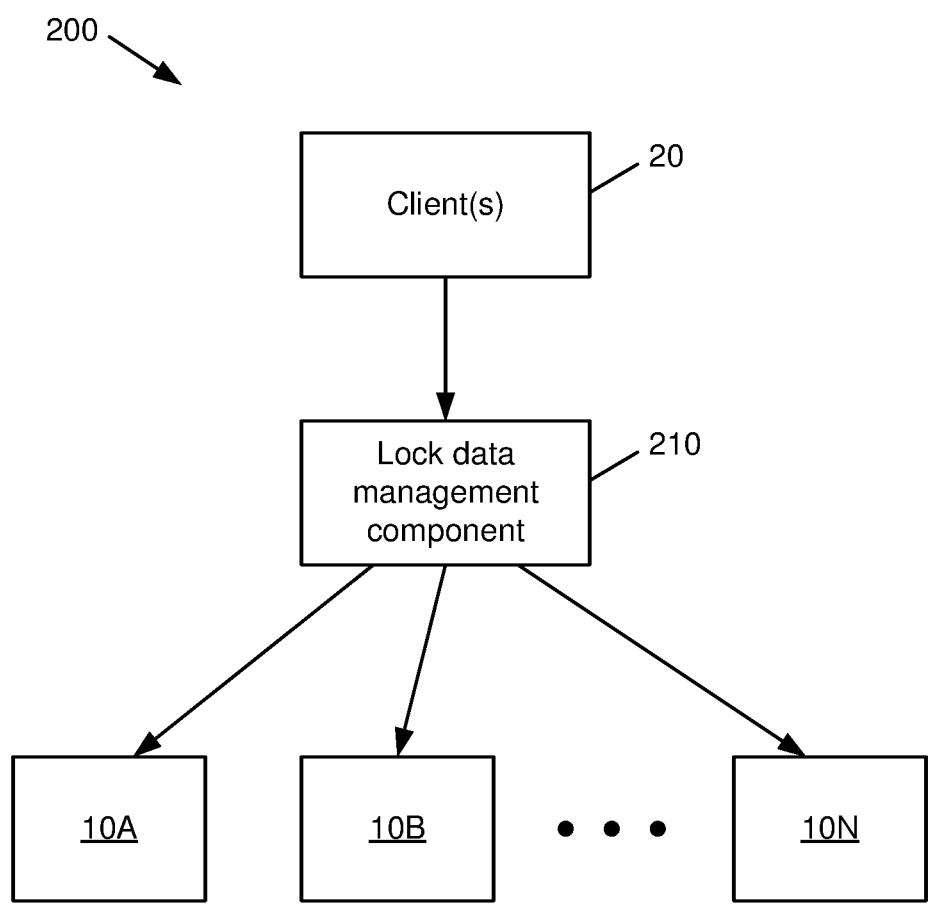
FIG. 2 is a block diagram of a system that facilitates managing client lock data in a distributed data storage system in accordance with various aspects described herein.

As described above, a data storage system, such as that shown by system 100 in FIG. 1, can regulate the distribution of client lock data for the data storage system. Turning now to FIG. 2, a block diagram of a system 200 is illustrated that facilitates managing client lock data in a distributed data storage system in accordance with various aspects described herein. Repetitive description of like elements employed in other embodiments described herein is omitted for brevity. As shown in FIG. 2, system 200 can include a lock data management component 210 that can assign client lock data for a client 20 associated with a data storage system to a selected computing node 10 in system 200, e.g., a computing node 10 designated by the group update component 130 from among the computing nodes 10 in a selected failure domain as defined by the node assignment component 110 as shown in FIG. 1. While system 200 illustrates a set of N computing nodes 10, it should be appreciated that any number of computing nodes 10 could be employed in system 200 via similar means.

In an aspect, the lock data management component 210 can provide techniques to protect client lock information against drive or node failures and/or computing nodes 10 otherwise becoming unavailable. By way of non-limiting example as shown by diagram 300 in FIG. 3, the lock data management component 210 can facilitate in-memory replicas of client lock state, where each client 20 is assigned to a primary node, here node 10A, via a hashing function (e.g., as provided by the hashing component 120). A client can further be assigned to two backup nodes, here nodes 10B and 10C, through the same hashing function or a different hashing function. In an aspect, the technique illustrated by diagram 300 can function as a lock failover (LKF) system in which node 10A serves as a primary delegate for lock information associated with a given client 20 and nodes 10B-10C serve as backup delegates for that lock information. Other techniques are also possible.

As a result of employing the lock failover technique shown by diagram 300, the overall cluster can tolerate single or double node failures with minimal to no impact. For instance, as shown by diagram 400 in FIG. 4, in the event that the primary delegate node 10A becomes unavailable, the lock data management component 210 can designate one of the backup delegate nodes, here node 10B, as a new primary delegate. The lock data management component 210 can then designate one or more new backup delegates, such as node 10D shown in diagram 400, as needed to maintain appropriate redundancy. In an aspect, the lock data management component 210 can designate new primary and/or backup delegates as necessary by propagating client lock data associated with respective existing delegate nodes to additional different nodes in the same data failure domain (e.g., the same node pool). Other techniques could also be used.

Figure 3:
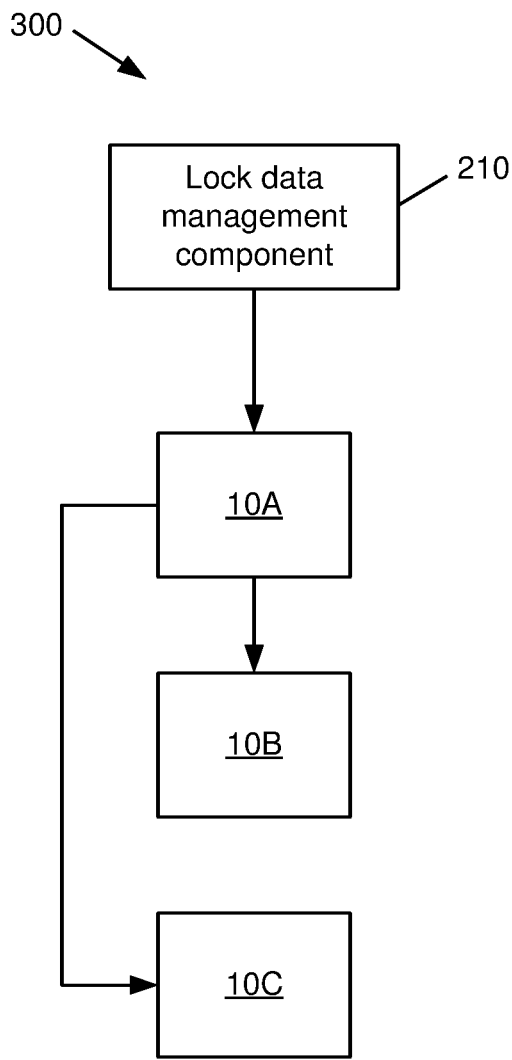
FIGS. 3-4 are diagrams depicting example client lock data delegations that can be performed between respective devices of a distributed data storage system in accordance with various aspects described herein.
Figure 4:
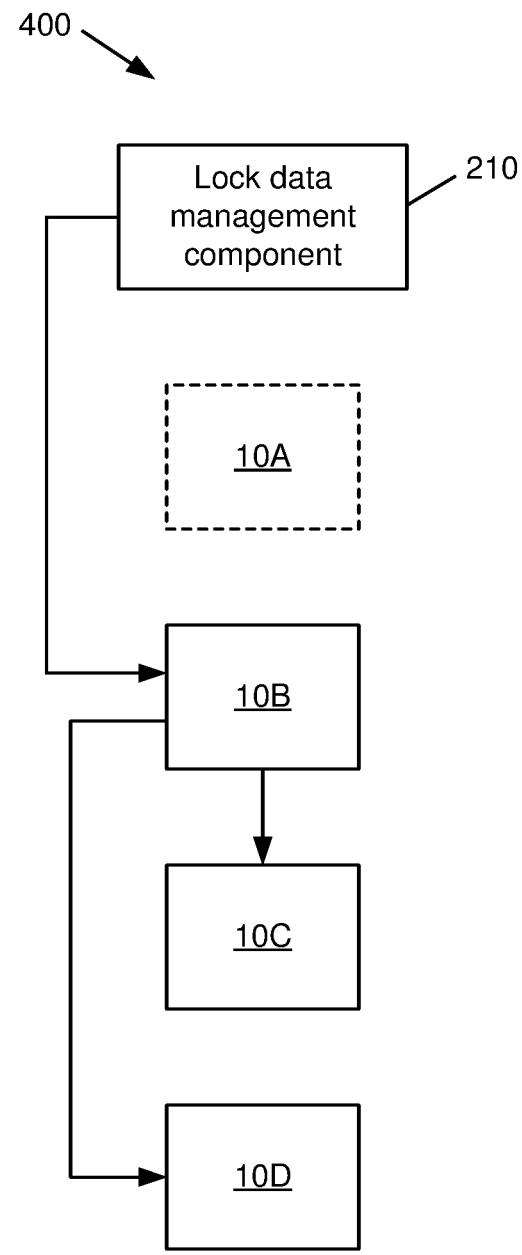

In the example node configurations shown in FIGS. 3-4, the lock data management component 210 utilizes a redundancy scheme based on sets of three delegate nodes, thereby enabling the data storage system to tolerate failures of up to two of the delegate nodes for a particular client. It should be appreciated, however, that any suitable number of delegate nodes could be utilized by the lock data management component 210 for managing lock data associated with a given client. Further, it should be appreciated that in some implementations, lock data associated with some clients may be associated with different numbers of delegate nodes as that associated with other clients.

Figure 5:
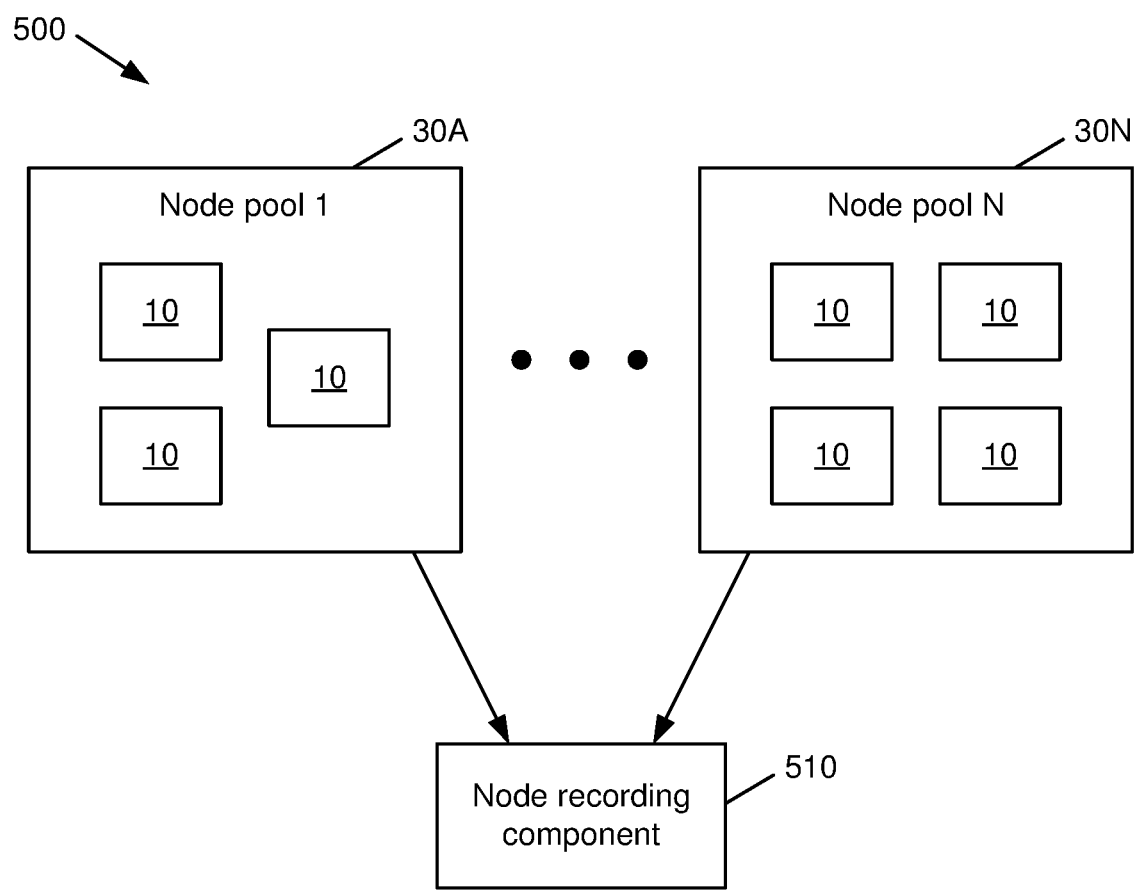
FIG. 5 is a block diagram of a system that facilitates maintaining data associated with respective data failure domains in a distributed computing system in accordance with various aspects described herein.

Turning now to FIG. 5, a block diagram of a system 500 that facilitates maintaining data associated with respective failure domains in a distributed computing system in accordance with various aspects described herein is illustrated. Repetitive description of like elements employed in other embodiments described herein is omitted for brevity. As shown in FIG. 5, system 500 can include a node recording component 510 that can maintain a record, e.g., as part of a database and/or other data structure, that includes information relating to associations between computing nodes 10 of system 500 and respective failure domains associated with system 500. For instance, as shown by FIG. 5, the node recording component 510 can maintain records associated with identities of respective computing nodes 10 that are associated with respective node pools 30, and/or failure domains of other suitable structures, in system 500. While the node recording component 510 is illustrated as a standalone component in FIG. 5, it should be appreciated that some or all of the functionality of the node recording component 510 could be implemented by one or more other system components, such as the node assignment component 110 described above with respect to FIG. 1, and/or other suitable components.

In an aspect, a data storage system can leverage knowledge of respective node pools and/or other failure domains, as well as the respective computing nodes 10 that are associated with such domains, to enhance the reliability of the system. For instance, returning to FIG. 2, the lock data management component 210 can leverage knowledge of the failure domains associated with the system to assign client lock data to respective computing nodes 10 according to their respective failure domains.

By way of example, the group update component 130 and/or the lock data management component 210 can assign lock data for a first set of clients 20 to computing nodes 10 in a first failure domain while assigning lock data for a second, mutually exclusive set of clients 20 to computing nodes 10 in a second, different failure domain. More particularly, the group update component 130 can utilize a hash function, e.g., based on the hashing information generated by the hashing component 120, to determine the computing nodes 10 that are responsible for maintaining client lock states for a particular client 20. For instance, the computing nodes 10 selected for a given client 20 can be based on a hash of the client ID associated with the client 20 and/or other information. The above hash function can be generated with reference to the node pools 30 in the system, such that the group update component 130 can designate a given computing node 10 in the system by first selecting a node pool 30 corresponding to the client 20 and then selecting one or more available computing nodes 10 from the selected node pool 30.

The above two-tiered approach utilized by the group update component 130 can improve the performance of a data storage system by enabling group updates on multiple failure domains simultaneously. For instance, the lock failover scheme described above with respect to FIGS. 3-4 can be designed to tolerate a given number of node failures (e.g., two node failures in the specific example shown by FIGS. 3-4). If there are more than the tolerated number of node failures in a given failure domain, file access and/or integrity of client lock data associated with that failure domain could be adversely impacted. If node unavailability is uncorrelated across failure domains, then each successive node failure would increase the probability of partial or full data unavailability in the system. In contrast, the group update component 130 can facilitate an upgrade process in which nodes 10 are rebooted in parallel with respect to the known data failure domains to avoid any data unavailability, at which point client locking information could also be lost.

Returning to FIG. 1, the group update component 130 can utilize hashing information obtained from the hashing component 120 that corresponds to respective computing nodes 10, as well as the node pools 30 and/or other data failure domains with which the respective computing nodes 10 are associated, as described above. Accordingly, when determining one or more computing nodes 10 to remove from the system (e.g., for maintenance and/or other purposes), the group update component 130 can first configure a node pool 30 from the system and then select a node 10 in the configured node pool 30 for removal. The group update component 130 can then perform similar operations on other node pools 30 in the system, thereby enabling maintenance and/or other actions to be performed on a greater number of computing nodes 10 in the system.

Figure 6:
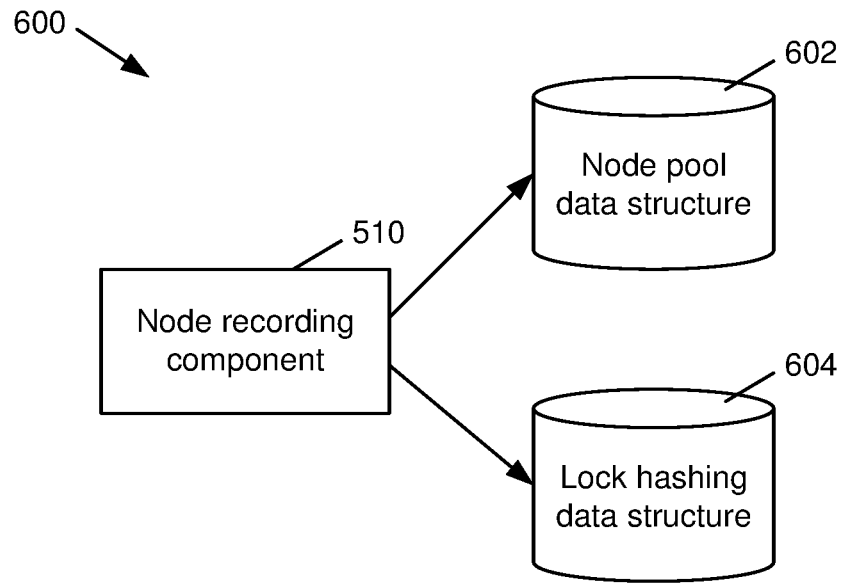
FIGS. 6-7 are block diagrams of respective systems that facilitate maintenance of respective data structures for data failure domains and client lock data in accordance with various aspects described herein.

Turning now to FIG. 6, a block diagram of a system 600 that facilitates maintenance of respective data structures for failure domains and client lock data in accordance with various aspects described herein is illustrated. Repetitive description of like elements employed in other embodiments described herein is omitted for brevity. As shown in FIG. 6, system 600 can include a node recording component 510 that can maintain a first record corresponding to identities of available computing nodes 10 in a given failure domain as described above. In an aspect, the node recording component 510 can maintain the first record in a node pool data structure 602, which can be a database and/or other suitable data structure. As further shown in FIG. 6, the node recording component 510 can further maintain a second record that relates to the hashing information for the failure domain co corresponding to the node pool data structure 602. Similar to the node pool data structure 602, the node recording component 510 can maintain the second record in a lock hashing data structure 604, which can be, e.g., a hash table or distributed hash table, a database, and/or any other suitable data structure. In an aspect, the lock hashing data structure 604 can utilize the same structure, or a different structure, as the node pool data structure 602.

In an aspect, the node recording component 510 can update the node pool data structure 602 and the lock hashing data structure 604 at different times to facilitate efficient operation of an associated data storage system. By way of example, the node recording component 510 can update the node pool data structure 602 with derived node pool information at a first time corresponding to the group update component 130 designating one or more computing nodes 10 in the system. For instance, when the group update component 130 performs a group change to change the active set of nodes 10 in the system, the node recording component 510 can advertise the current understood node pool, and the hashing component 120 can utilize this information as input to its generated hash information until the next group change. The node recording component 510 can then update the lock hashing data structure 604 at a second time that differs from the first time at which the node pool data structure 602 is updated (e.g., a time either before or after the first time). For instance, when the node pool data structure 602 changes, the node recording component 510 can trigger a synthetic group change at a subsequent time to execute migration of the lock hashing data structure at a time that is not significantly impactful to customer workflows.

Figure 7:
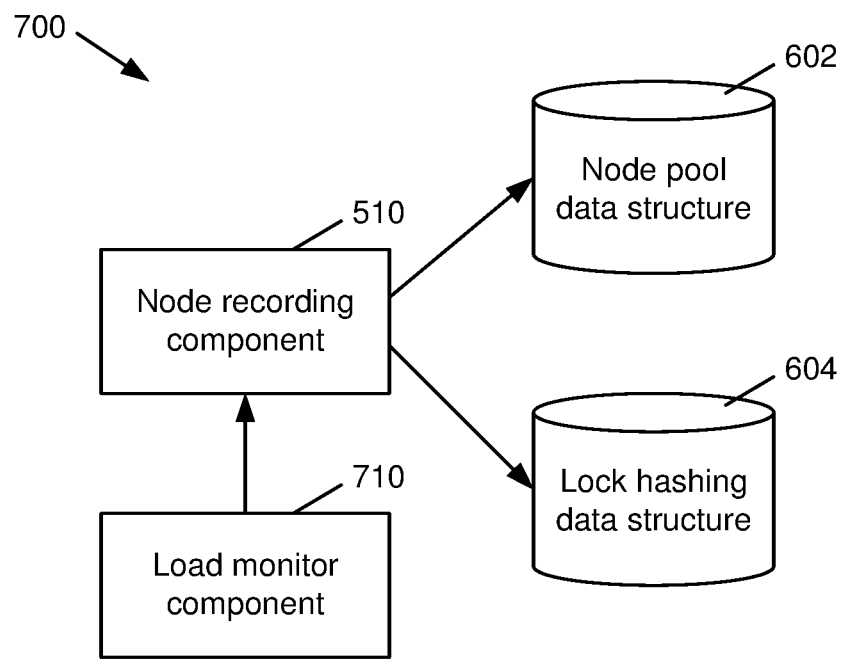

In order to determine a desired time to update the lock hashing data structure 604, the node recording component 510 can operate in combination with a load monitor component 710, as shown by system 700 in FIG. 7. In an aspect, the load monitor component 710 can monitor a system load associated with the data storage system and instruct the node recording component 510 to update the lock hashing data structure 604 at a time of low system load, e.g., at a time in which the system load is less than a threshold system load.

Figure 8:
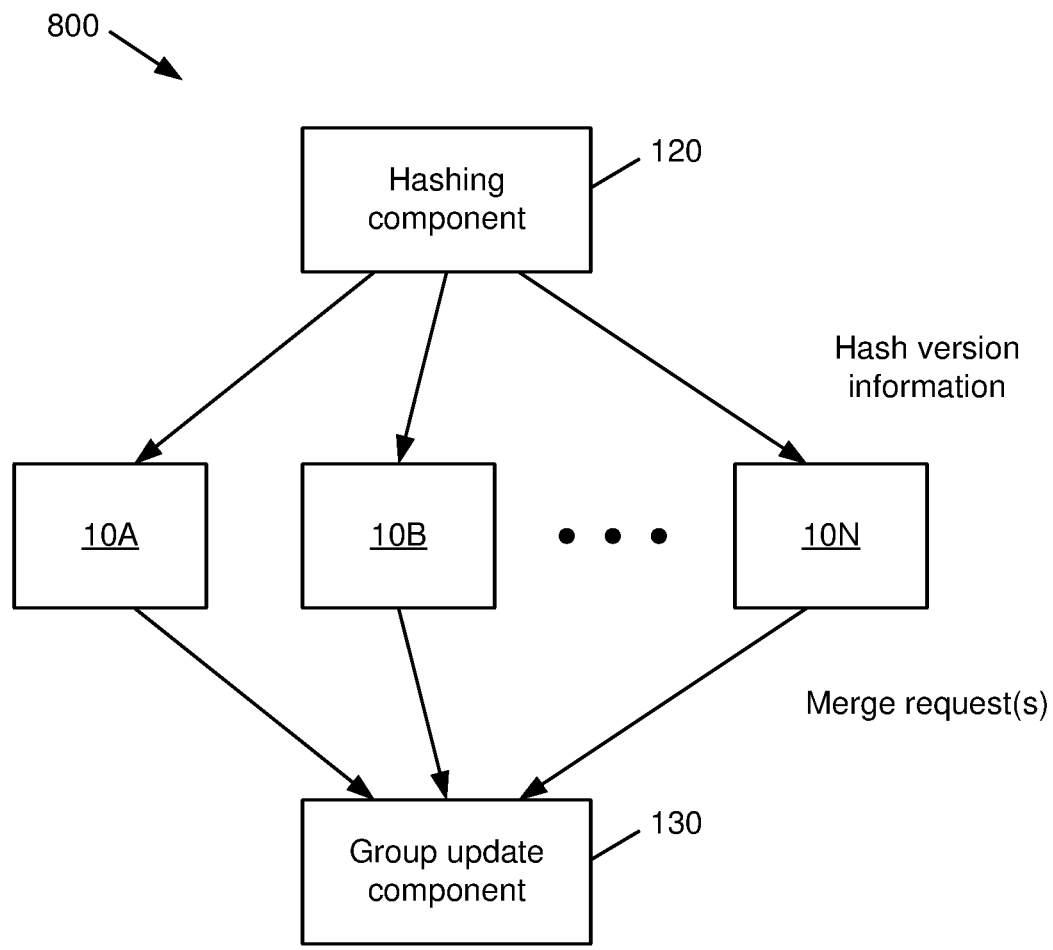
FIG. 8 is a block diagram of a system that facilitates generating and processing group update requests in a distributed system in accordance with various aspects described herein.

In an aspect, the techniques described above with respect to FIGS. 6-7 can facilitate asynchronous updates of node pool information and client lock information. As further shown by system 800 in FIG. 8, the hashing component 120 can propagate versioning data associated with its hashing information (e.g., corresponding to the node pool data structure 602 and/or the lock hashing data structure 604) to respective computing nodes 10 in the system. In an aspect, this can be accomplished by including a version of the hashing information as part of node status messages and/or other routine messages associated with system 800.

As further shown by system 800, the group update component 130 can be configured to merge a first computing node 10 in a failure domain based on requests submitted from a second computing node 10, which can be the same as or different from the first computing node 10. However, since it is possible for a computing node 10 to come up in a state where it cannot access the node pool data structure 602 and then merge into a group where it can, unneeded resets of the lock hashing data structure 604 can be avoided by allowing only computing nodes 10 with the most recent version of the node pool data structure 602 to initiate and control a group change process to merge in other nodes. Stated another way, if a requesting computing node 10 has outdated hashing information from the hashing component 120, the group update component 130 can be configured to deny merge requests from that computing node 10 until the computing node 10 is provided with the most recent information.

Figure 9:
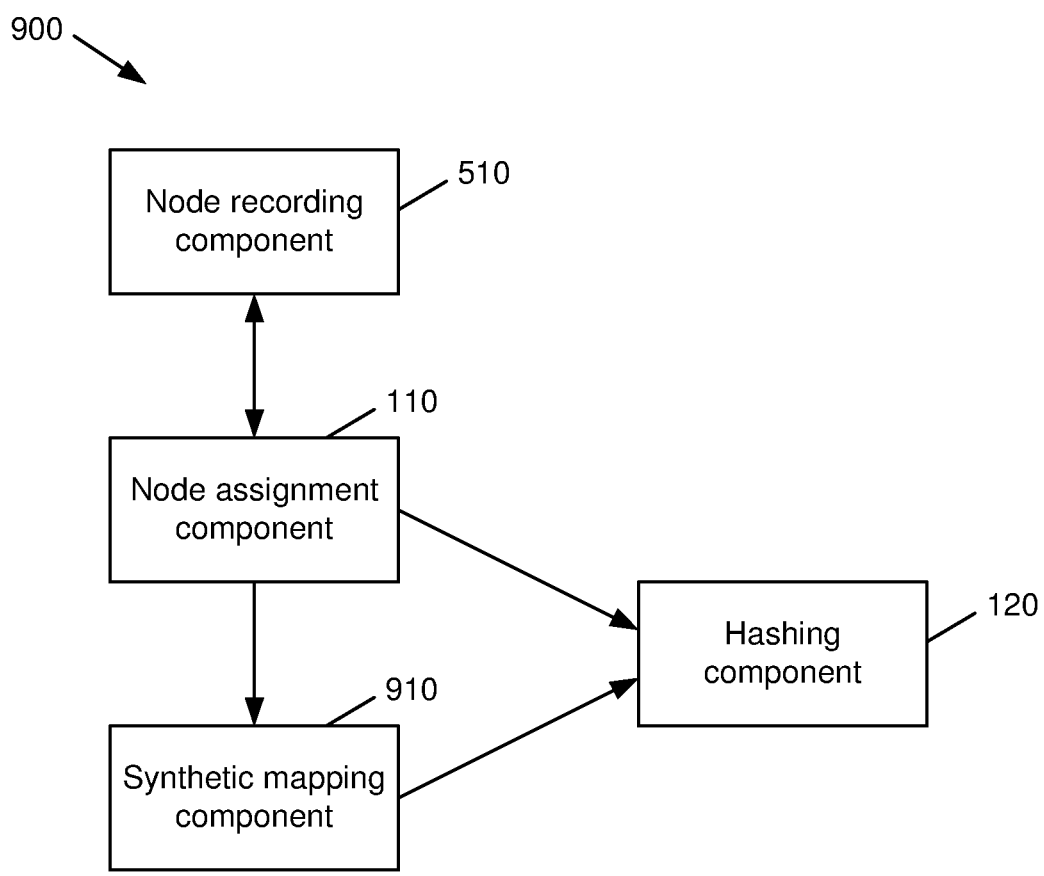
FIG. 9 is a block diagram of a system that facilitates synthetic generation of data failure domains in a distributed system in accordance with various aspects described herein.

Turning next to FIG. 9, a block diagram of a system 900 that facilitates synthetic generation of failure domains in a distributed system in accordance with various aspects described herein is illustrated. Repetitive description of like elements employed in other embodiments described herein is omitted for brevity. As shown in FIG. 9, system 900 can include a node recording component 510 that can operate together with a node assignment component 110 to assign computing nodes 10 to respective failure domains as described above. As further shown in FIG. 9, a hashing component 120 can generate hashing information corresponding to the respective data failure domains as further described above with respect to FIG. 1.

In an aspect, respective computing nodes 10 and/or clusters in a data storage system may in some cases be unable to read the node pool data structure 502 due to, e.g., insufficient nodes in the system and/or the wrong nodes in the system. In such a scenario, system 900 can further include a synthetic mapping component 910 that can generate a synthetic map of the computing nodes 10. This can, in turn, enable bootstrapping of the system by enabling the hashing component 120 to operate based on the synthetic mapping provided by the synthetic mapping component 910, thereby enabling system operation to continue in cases of cluster unavailability and/or other events resulting in large-scale unavailability among the nodes in the system.

Figure 10:
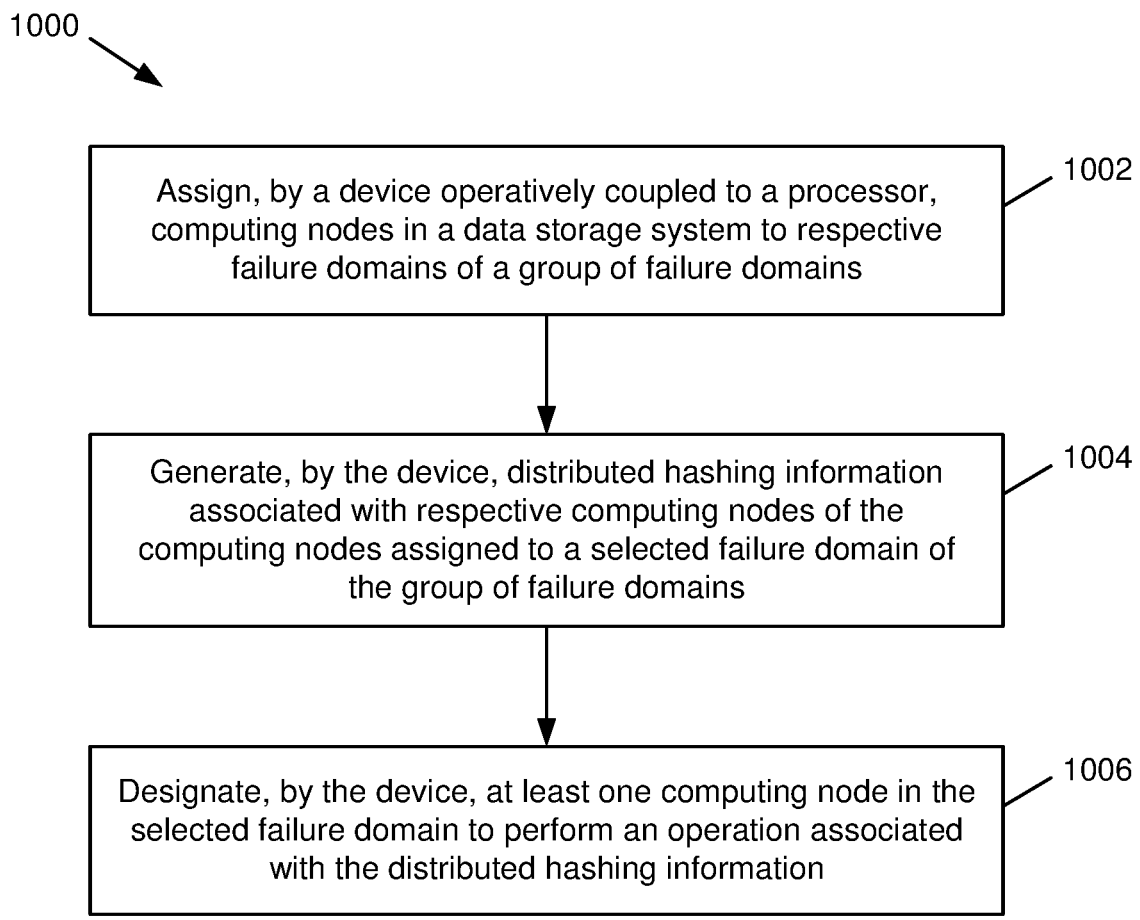
FIG. 10 is a flow diagram of a method that facilitates harmonization of failure domains in a distributed computing system in accordance with various aspects described herein.

With reference now to FIG. 10, presented is a flow diagram of a method 1000 that facilitates harmonization of failure domains in a distributed computing system in accordance with various aspects described herein. At 1002, a device operatively coupled to a processor can assign (e.g., by a node assignment component 110) computing nodes (e.g., computing nodes 10) in a data storage system to respective failure domains (e.g., node pools 30) of a group of failure domains.

At 1004, the device can generate (e.g., by a hashing component 120) distributed hashing information (e.g., a distributed hash table, etc.) associated with respective computing nodes that were assigned to a selected failure domain from among the failure domains processed at 1002.

At 1006, the device can designate (e.g., by a group update component 130) at least one computing node in the selected failure domain for which the distributed hashing information was generated at 1004 to perform an operation associated with said hashing information.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that method can alternatively be represented as a series of interrelated states or events, such as in a state diagram. Moreover, not all illustrated acts may be required to implement methods in accordance with certain aspects of this disclosure.

Figure 11:
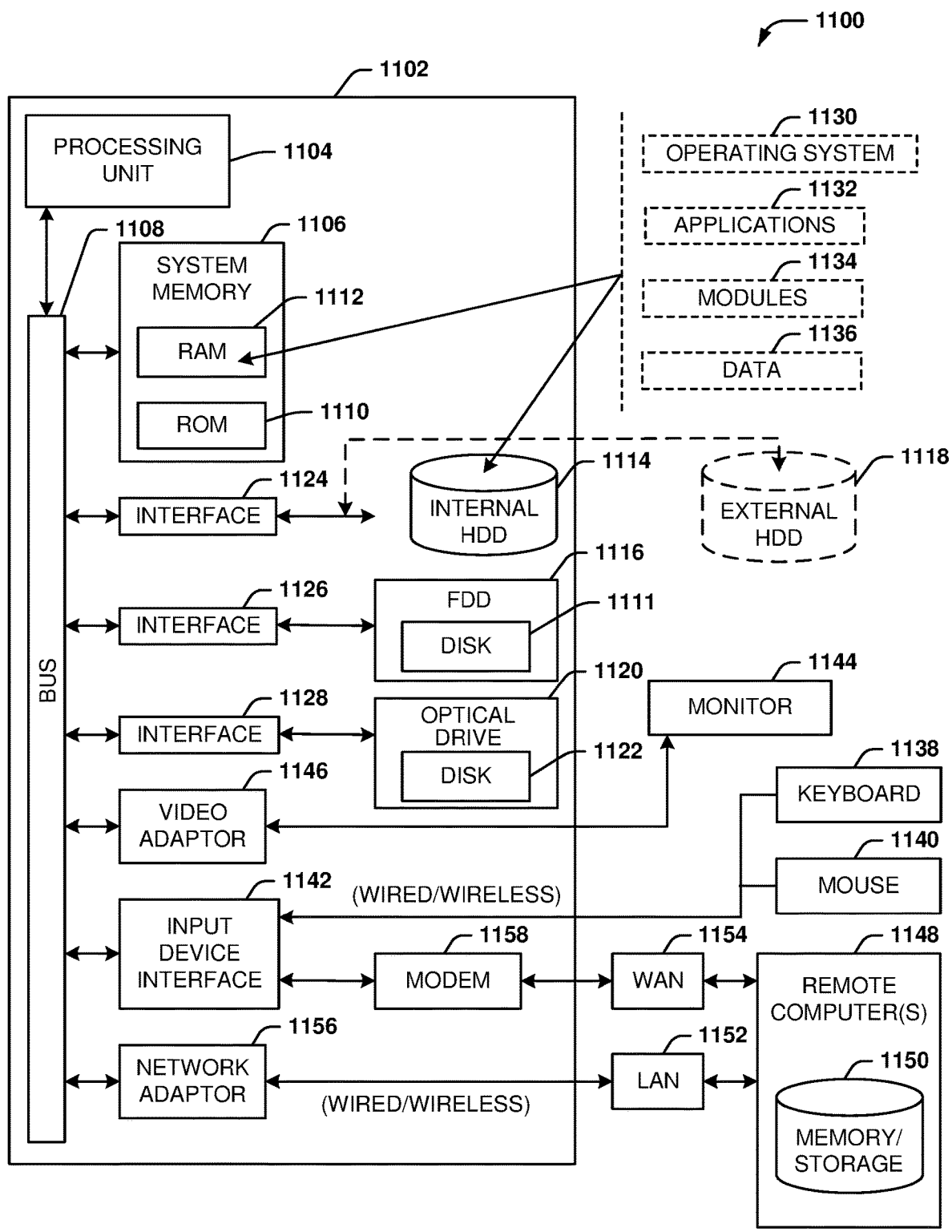
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes computer executable components stored in the memory, wherein the computer executable components comprise:
        a node assignment component that assigns computing nodes in the data storage system to respective failure domains of a set of failure domains;
        a hashing component that generates hashing information associated with respective computing nodes of the computing nodes assigned to a selected failure domain of the set of failure domains; and
        a group update component that designates at least one computing node of the computing nodes in the selected failure domain to perform an operation associated with the hashing information at least in part by receiving a merge request to merge a first computing node into the selected failure domain from a second computing node in the selected failure domain and denying the merge request in response to the second computing node being determined to comprise outdated hashing information.

2. The data storage system of claim 1, wherein the computer executable components further comprise:
    a lock data management component that assigns client lock data for a client associated with the data storage system to a third computing node of the computing nodes in the selected failure domain in response to the third computing node being designated by the group update component.

3. The data storage system of claim 2, wherein the lock data management component propagates the client lock data from the third computing node to a fourth computing node of the computing nodes in the selected failure domain, which is different from the third computing node, in response to the third computing node becoming unavailable.

4. The data storage system of claim 1, wherein the computer executable components further comprise:
    a node recording component that maintains a first record comprising identities of respective available computing nodes in the selected failure domain.

5. The data storage system of claim 4, wherein the node recording component further maintains a second record relating to the hashing information associated with the selected failure domain, wherein the node recording component updates the first record at a first time corresponding to designation of the at least one computing node in the selected failure domain by the group update component, and wherein the node recording component updates the second record at a second time that is different from the first time.

6. The data storage system of claim 5, wherein the computer executable components further comprise:
a load monitor component that monitors a system load associated with the data storage system, wherein the second time corresponds to the system load being less than a threshold system load.

7. The data storage system of claim 4, wherein the computer executable components further comprise:
a synthetic mapping component that generates a synthetic mapping of the respective computing nodes in the selected failure domain in response to the first record being unavailable.

8. The data storage system of claim 1, wherein the hashing information comprises a distributed hash table.

9. The data storage system of claim 1, wherein the group update component grants the merge request and merges the first computing node into the selected failure domain in response to the second computing node having up-to-date hashing information.

10. The data storage system of claim 1, wherein the hashing component propagates at least a portion of the hashing information to respective computing nodes in the selected failure domain comprising the second computing node.

11. A method, comprising:
assigning, by a device operatively coupled to a processor, computing nodes in a data storage system to respective failure domains of a group of failure domains;
generating, by the device, distributed hashing information for respective computing nodes of the computing nodes assigned to a selected failure domain of the group of failure domains; and
designating, by the device, at least one computing node in the selected failure domain to perform an operation associated with the distributed hashing information;
receiving, by the device from a second computing node in the selected failure domain, a request to merge a first computing node into the selected failure domain; and
denying, by the device, the request in response to the second computing node comprising outdated distributed hashing information.

12. The method of claim 11, further comprising:
assigning, by the device, client lock data for a client associated with the data storage system to a third computing node of the computing nodes in the selected failure domain in response to the third computing node being designated via the designating.

13. The method of claim 12, further comprising:
propagating, by the device, the client lock data from the third computing node to a fourth computing node of the computing nodes in the selected failure domain, which is different from the third computing node, in response to the third computing node becoming unavailable.

14. The method of claim 11, further comprising:
maintaining, by the device, a first record comprising identities of respective available computing nodes in the selected failure domain.

15. The method of claim 14, further comprising:
maintaining, by the device, a second record relating to the distributed hashing information associated with the selected failure domain;
updating, by the device, the first record at a first time corresponding to the designating the at least one computing node in the selected failure domain; and
updating, by the device, the second record at a second time that is different from the first time.

16. The method of claim 15, further comprising:
monitoring, by the device, a system load associated with the data storage system, wherein the second time corresponds to the system load being less than a threshold system load.

17. A non-transitory machine-readable medium comprising computer executable instructions that, when executed by a processor of a data storage system, facilitate performance of operations, the operations comprising:
assigning computing nodes in the data storage system to respective failure domains;
generating a distributed hash table associated with respective computing nodes of the computing nodes assigned to a selected failure domain of the respective failure domains;
designating at least one computing node in the selected failure domain to perform an operation associated with the distributed hash table; and
in response to a first computing node in the selected failure domain being determined to comprise outdated information associated with the distributed hash table, denying a request from the first computing node to merge a second computing node into the selected failure domain.

18. The non-transitory machine-readable medium of claim 17, wherein the operations further comprise:
assigning client lock data for a client associated with the data storage system to a third computing node of the computing nodes in the selected failure domain in response to the third computing node being designated via the designating; and
propagating the client lock data from the third computing node to a fourth computing node of the computing nodes in the selected failure domain, which is different from the third computing node, in response to the third computing node becoming unavailable.

19. The non-transitory machine-readable storage medium of claim 17, wherein the operations further comprise:
maintaining a first record comprising identities of respective available computing nodes in the selected failure domain;
maintaining a second record comprising information relating to the distributed hash table;
updating the first record at a first time corresponding to the designation of the at least one computing node in the selected failure domain; and
updating the second record at a second time that is different from the first time.

20. The non-transitory machine-readable medium of claim 19, wherein the operations further comprise:
monitoring a system load associated with the data storage system, wherein the second time corresponds to the system load being less than a threshold system load.

* * * * *